United States Patent
Bieger

(10) Patent No.: US 11,987,232 B2
(45) Date of Patent: May 21, 2024

(54) METHOD FOR DRIVING AUTONOMOUSLY OUT OF A PARKED POSITION

(71) Applicant: Continental Automotive GmbH, Hannover (DE)

(72) Inventor: Stefan Bieger, Nidda (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/767,412

(22) PCT Filed: Oct. 5, 2020

(86) PCT No.: PCT/EP2020/077889
§ 371 (c)(1),
(2) Date: Apr. 7, 2022

(87) PCT Pub. No.: WO2021/069392
PCT Pub. Date: Apr. 15, 2021

(65) Prior Publication Data
US 2024/0109531 A1    Apr. 4, 2024

(30) Foreign Application Priority Data
Oct. 8, 2019   (DE) .................... 10 2019 215 411.5

(51) Int. Cl.
*B60W 30/06*    (2006.01)
*B60W 60/00*    (2020.01)
*H04W 4/44*     (2018.01)

(52) U.S. Cl.
CPC .......... *B60W 30/06* (2013.01); *B60W 60/001* (2020.02); *H04W 4/44* (2018.02);
(Continued)

(58) Field of Classification Search
CPC .............. B60W 30/06; B60W 60/001; B60W 2420/403; B60W 2420/50; B60W 2420/54; B60W 2556/45; H04W 4/44
See application file for complete search history.

(56) References Cited

U.S. PATENT DOCUMENTS

2009/0043430 A1   2/2009 Boss et al.
2014/0244073 A1   8/2014 Okamura et al.
(Continued)

FOREIGN PATENT DOCUMENTS

CN   110239522 A  *  9/2019  ............ B60W 30/06
DE   102017200158 A1    7/2018
(Continued)

OTHER PUBLICATIONS

Office Action dated Aug. 6, 2020 from corresponding German patent application No. 10 2019 215 411.5.
(Continued)

*Primary Examiner* — Daryl C Pope

(57) ABSTRACT

A method for driving autonomously out of a parked position by a vehicle is provided. It comprises the steps of: a) detecting an unlock-signal for unlocking a central locking system of a first vehicle parked at a first position by a second vehicle parked at a second position; b) determining whether the two vehicles are parked parallelly and directly next to each other; c) if so, driving the second vehicle autonomously at least partly out of the second position; d) determining whether the first vehicle has left at least partly said first position; and, e) if so, driving the second vehicle autonomously back in said second position.

14 Claims, 4 Drawing Sheets

(52) U.S. Cl.
CPC ... *B60W 2420/403* (2013.01); *B60W 2420/50* (2013.01); *B60W 2420/54* (2013.01); *B60W 2556/45* (2020.02)

(56) References Cited

U.S. PATENT DOCUMENTS

| | | |
|---|---|---|
| 2015/0039173 A1 | 2/2015 | Beaurepaire et al. |
| 2015/0149022 A1 | 5/2015 | Harvey |
| 2018/0029642 A1 | 2/2018 | Mayer et al. |
| 2018/0162384 A1 | 6/2018 | Kim |
| 2018/0196420 A1 | 7/2018 | Nordbruch |
| 2018/0336786 A1* | 11/2018 | Salter .................... B60Q 9/008 |

FOREIGN PATENT DOCUMENTS

| | | |
|---|---|---|
| DE | 102017116753 A1 | 1/2019 |
| EP | 3261074 A1 | 12/2017 |
| GB | 2552020 A | 1/2018 |
| GB | 2552407 A | 1/2018 |
| JP | 2009166612 A * | 7/2009 |
| KR | 20160056435 A | 5/2016 |

OTHER PUBLICATIONS

International Search Report and Written Opinion dated Jan. 12, 2021 from corresponding International patent application No. PCT/EP2020/077889.

* cited by examiner

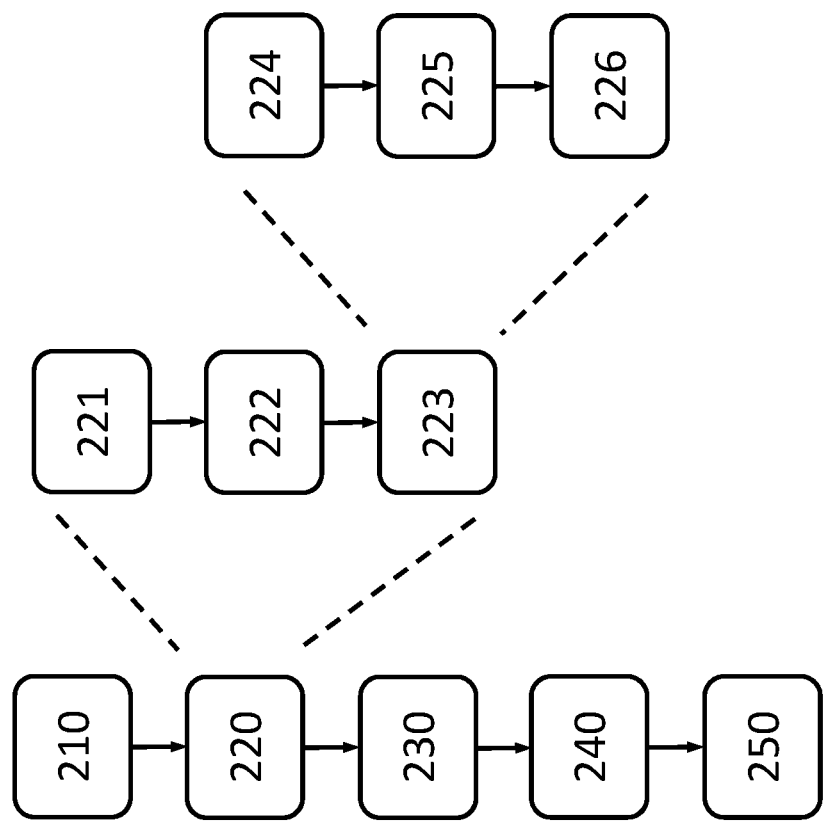

METHOD FOR DRIVING AUTONOMOUSLY OUT OF A PARKED POSITION

BACKGROUND

Many modern vehicles are equipped with an autonomously driving system, which may assist the driver with parking his vehicle. Some autonomously driving systems allow the driver to be outside of the vehicle while the vehicle fully autonomously drives itself in or out of a parked position. Thus, the driver does not need to open any door of the vehicle in the parked position. Because of this, vehicles with such systems can be parked closer together than vehicles without such systems. However, since not all vehicles are equipped with such systems, vehicles will continue to be parked at a regular distance from each other. In this way, the parking space is not used as efficiently as possible.

The objective of the invention is how to improve the usage of parking space.

SUMMARY OF THE INVENTION

The objective of the invention is met by providing a method and a vehicle according to the independent claims.

A method for driving autonomously out of a parked position by a vehicle is provided, comprising the steps of:
  a) detecting an unlock-signal for unlocking a central locking system of a first vehicle parked at a first position, by a second vehicle parked at a second position;
  b) determining whether said first and second vehicle are parked parallelly and directly next to each other in response to said unlock-signal;
  c) if so, driving the second vehicle autonomously at least partly out of the second position, thereby allowing a driver of the first vehicle to enter the first vehicle and to drive the first vehicle at least partly out of said first position;
  d) determining whether the first vehicle has left at least partly said first position; and,
  e) if so, driving the second vehicle autonomously back in said second position.

Each of the mentioned vehicles may be a car, motorbike, van or truck. They may also be a bicycle or a scooter.

The wording "driving autonomously" in this document refers to the capability of a vehicle to drive itself, or at least to leave or enter a parked position without a driver inside the car.

The unlock-signal may be an electromagnetic or acoustic signal used to unlock the central locking system of first vehicle. This system enables the remote locking or unlocking of all or at least one door of the vehicle. The signal may be transmitted by a key or a smart device, such as a smartphone.

The first vehicle may be a vehicle without the capability of driving autonomously. In that case, when the first vehicle is in a parked position, a standard minimum parking distance between this first vehicle and a second vehicle that is going to be parked next to the first vehicle, should be observed. This standard minimum parking distance allows a driver to enter the first vehicle in its parked position. The driver may then drive the first vehicle out its parked position.

A second vehicle may be unable to park next to the first vehicle because of this standard minimum parking distance to be observed. However, the second vehicle may be able to (temporarily) park out of its parked position, thereby allowing the driver to enter the first vehicle. After the first vehicle has left its parked position (with its drive inside), the second vehicle may drive back to its parked position.

In this case, the standard minimum parking distance needs not to be observed and the first and the second vehicle may be parked more closely to each other.

According to an embodiment of the method according to the invention, step b) comprises:
  b1) activating a sensor in said second vehicle in response to said unlock-signal;
  b2) detecting, by said sensor, a signal, transmitted by said first vehicle, optionally in response to a further unlock-signal; and,
  b3) determining whether said first and second vehicle are parked parallelly and directly next to each other, based on said detected signal.

The second vehicle may be arranged for detecting the unlock-signal transmitted to the first vehicle. In response, a sensor in the second vehicle is activated. The sensor may be arranged for detecting electromagnetic, ultrasonic and/or RF signals.

When the driver approaches his vehicle, i.e. the first vehicle, and notices that the standard minimum parking distance has not been observed by the second vehicle (the second vehicle is parked too closely to the first vehicle) and he is unable to enter his vehicle, he may transmit an unlock-signal.

This unlock-signal or a further unlock-signal may then trigger the first vehicle to transmit a signal. This signal may then be detected by the second vehicle and then used to determine the relative positions and/or orientation of the first and the second vehicle.

The signal may comprise information about the position and/or orientation of the first vehicle (for example comprising GPS information), which may be compared with information about the position and/or orientation of the second vehicle (for example comprising GPS information).

An advantage of this embodiment is that the second vehicle only drives out of its parked position when (i) the second vehicle is parked next to the first vehicle and (ii) the driver of the first vehicle requires it.

According to a further embodiment of the method according to the invention, the sensor in the second vehicle is a camera and the signal from the first vehicle is an indicator light signal. The sensor in the second vehicle may also comprise multiple cameras directed to one or more directions.

Based on the intensity and/or direction of the detected indicator light signals, the position and/or orientation of the first vehicle with respect to the second vehicle may be determined.

The detected indicator light signals may comprise a code or an information signal, that indicates the position and/or orientation of the first vehicle (for example comprising GPS information).

An advantage of this embodiment is that the first vehicle uses its standard indicators lights and needs not to be equipped with additional devices. The second vehicle, that is arranged for autonomously driving and will thus probably have one or more cameras, uses its camera(s) and needs not to be equipped with additional devices.

According to an embodiment of the method according to the invention, the sensor in the second vehicle is an electromagnetic signal detector and said signal from said first vehicle is a TPMS (Tire Pressure Monitoring System) signal. The sensor in the second vehicle may also comprise multiple electromagnetic signal detectors directed to one or more directions.

Based on the intensity and/or direction of the detected TPMS signals, the position and/or orientation of the first vehicle may be determined. The detected TPMS signals may comprise a code or an information signal, that indicates the position and/or orientation of the first vehicle (for example comprising GPS information).

An advantage of this embodiment is that the first vehicle uses its standard TPMS sensors and needs not to be equipped with additional devices.

According to an embodiment of the method according to the invention, the sensor in the second vehicle is an ultrasonic detector and the signal from the first vehicle is an ultrasonic park distance signal. The sensor in the second vehicle may also comprise multiple ultrasonic detector directed to one or more directions. Based on the intensity and direction of the detected ultrasonic park distance signals, the position and/or orientation of the first vehicle may be determined.

An advantage of this embodiment is that the first vehicle uses its standard park distance sensors and needs not to be equipped with additional devices.

According to an embodiment of the method according to the invention, step b3) comprises:
b3a) determining a position and orientation of said first vehicle by said second vehicle;
b3b) determining a position and orientation of said second vehicle by said second vehicle; and,
b3c) determining whether said first and second vehicle are parked parallelly and directly next to each other, based on said determined position and orientation of said first vehicle and said determined position and orientation of said second vehicle, According to a further embodiment of the method according to the invention, said position and orientation of said first vehicle are determined based on information received by said second vehicle using Vehicle-to-X Communication, preferably from said first vehicle.

According to an embodiment of the method according to the invention, said position and orientation of said first vehicle are determined based on information gathered by sensors of said second vehicle when parking into said second position.

Furthermore, a vehicle for driving autonomously out of a parked position is provided, said vehicle comprising:
f) a detector arranged for detecting an unlock-signal for unlocking a central locking system of a first vehicle parked at a first position;
g) a determination unit arranged for determining whether said first and second vehicle are parked parallelly and directly next to each other in response to said unlock-signal;
h) an autonomous driving unit for driving the second vehicle autonomously at least partly out of the second position, when it is determined that said first and second vehicle are parked parallelly and directly next to each other,
wherein said determination unit is further arranged for determining whether the first vehicle has left at least partly said first position; and,
wherein said autonomous driving unit is further arranged for driving the second vehicle autonomously back in said second position, when it is determined that the first vehicle has left at least partly said first position.

According to an embodiment of the vehicle according to the invention, the vehicle further comprises:
a sensor arranged for being activated in response to said unlock-signal and for detecting a signal, transmitted by said first vehicle, in response to said unlock-signal or a further unlock-signal,
wherein said determination unit is arranged for determining whether said first and second vehicle are parked parallelly and directly next to each other, based on said detected signal.

According to an embodiment of the vehicle according to the invention,
said sensor is a camera and said signal from said first vehicle is an indicator light signal; or,
said sensor is an electromagnetic signal detector and said signal from said first vehicle is a TPMS signal; or,
said sensor is an ultrasonic detector and said signal from said first vehicle is an ultrasonic park distance signal.

According to an embodiment of the vehicle according to the invention, said determination unit is arranged for i) determining a position and orientation of said first vehicle by said second vehicle, ii) determining a position and orientation of said second vehicle by said second vehicle; and iii) determining whether said first and second vehicle are parked parallelly and directly next to each other, based on said determined position and orientation of said first vehicle and said determined position and orientation of second vehicle.

According to an embodiment of the vehicle according to the invention, said determination unit is arranged for receiving information using Vehicle-to-X Communication, preferably from said first vehicle, for determining said position and orientation of said first vehicle.

According to an embodiment of the vehicle according to the invention, said determination unit comprises sensors for gathering information about the position and orientation of said first vehicle when parking and wherein said determination unit is arranged for determining said position and orientation of said first vehicle based on said gathered information.

It may be understood that the working of and the corresponding advantages of the embodiments of the vehicle according to the invention correspond to the embodiments of the method according to the invention.

BRIEF DESCRIPTION OF THE DRAWINGS

For a more complete understanding of the present invention, reference in the following description is made to the accompanying drawings in which:

FIG. 2 shows a schematic overview of an embodiment of the method according to the invention; and, FIG. 3 shows a schematic overview of an embodiment of the vehicle according to the invention.

DETAILED DESCRIPTION OF THE INVENTION

Figure 1A:
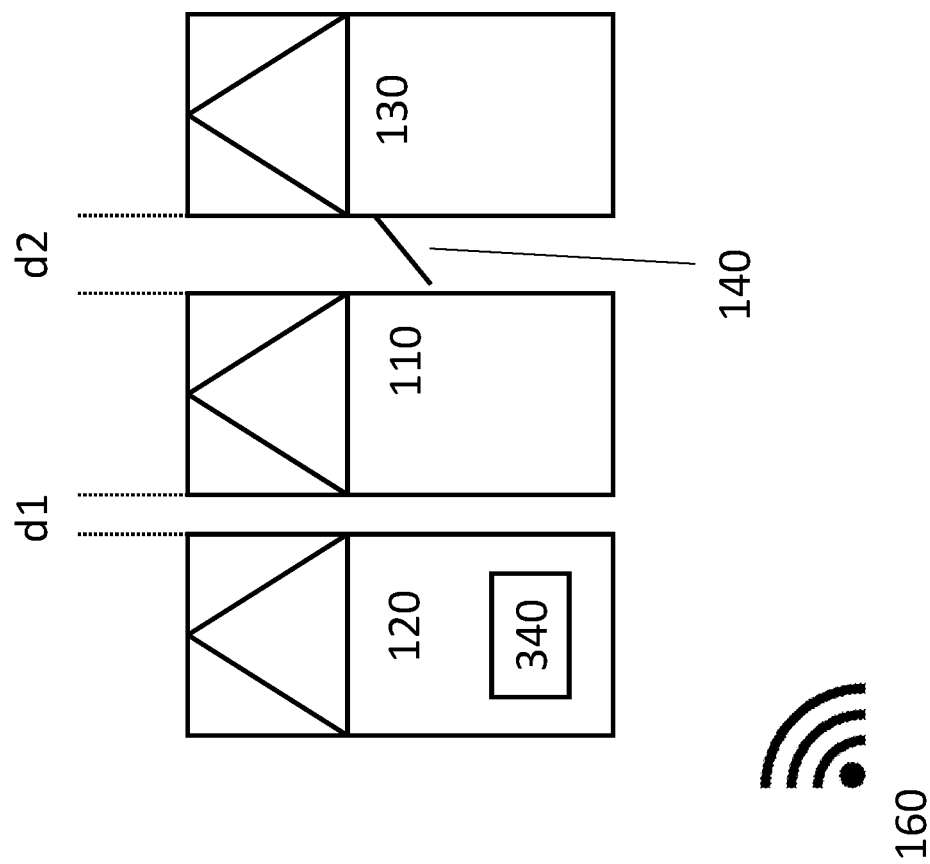
FIGS. 1a and 1b shows a schematic overview of a parking situation, in which the invention may be applied.
Figure 1B:
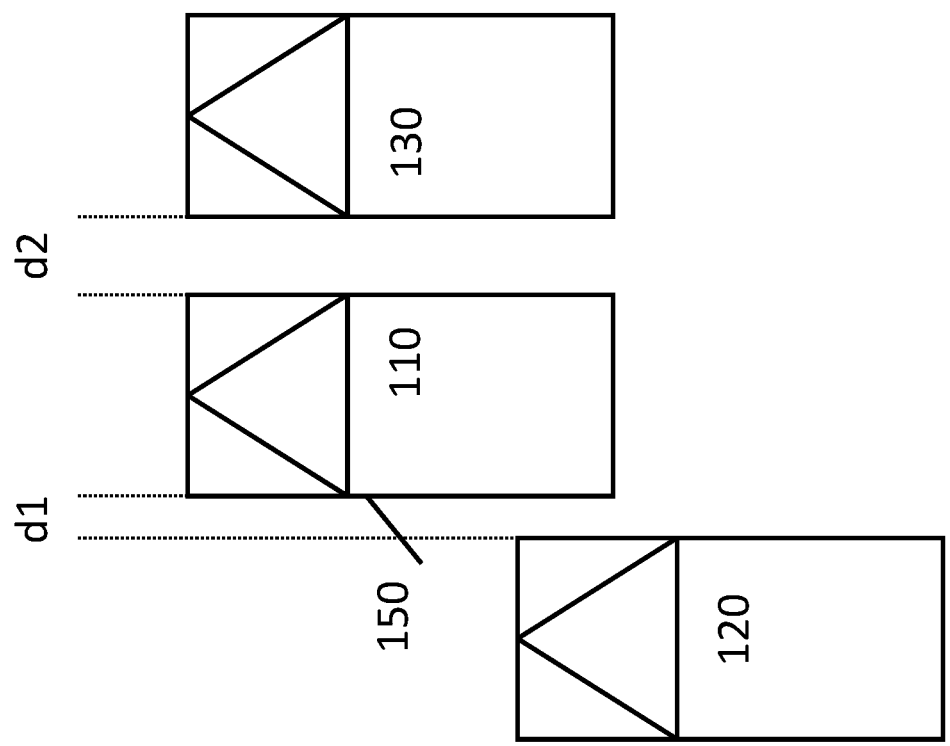

In FIGS. 1a and 1b, a schematic overview of a parking situation, in which the invention may be applied, is depicted. A vehicle 110 is parked next to vehicle 130.

Vehicle 110 and vehicle 130 may be vehicles without the capability of driving autonomously. In that case, these vehicles are not able to leave their parked position without a driver inside the car. Therefore, a standard minimum parking distance d2 between vehicle 110 and vehicle 130 has been observed. This distance d2 ensures that the vehicle door 140 may be opened sufficiently wide enough for the driver to enter vehicle 130.

Vehicle 120 may be a vehicle with the capability of driving autonomously. It may not be possible to observe the standard minimum parking distance d2 with respect to vehicle 110, when parking next to vehicle 110. An adjusted minimum parking distance d1, smaller than distance d2, may also be acceptable, if vehicle 120 temporarily leaves its parked position when the driver of vehicle 110 wishes to enter vehicle 110.

A driver may express this wish by transmitting an unlock-signal 160 (for example from his car key or his smart phone) to vehicle 110. Thus unlock-signal may be detected by vehicle 110 and by vehicle 120.

When the unlock-signal 160 detected by vehicle 120 is not for unlocking vehicle 110 but for unlocking vehicle 130, vehicle 120 needs not to temporarily leave its parked position in order to allow the driver to enter its vehicle.

Therefore, in response to the unlock-signal 160, it may be determined, for example by vehicle 120, whether vehicle 120 parked parallelly and directly next to the vehicle for which the unlock-signal was transmitted, i.e. vehicle 110.

To determine this, sensor 340 in vehicle 120 may be activated in response to unlock-signal 160. Sensor 340 is arranged for detecting a signal transmitted by vehicle 110, in response to unlock-signal 160 or in response to a second or further unlock-signal transmitted by the driver.

The signal transmitted by vehicle 110 may be an indicator light signal, a TPMS signal, an ultrasonic park distance signal and/or any other electromagnetic signal. The signal may also be transmitted using so-called Vehicle-to-X-communication technologies. The sensor 340 may be a camera, an electromagnetic signal detector and/or an ultrasonic detector.

Based on the detected signal, the position and orientation of vehicle 110 with respect to vehicle 120 may be determined and thus whether vehicle 120 parked parallelly and directly next to the vehicle 110.

The position and orientation of vehicle 110 with respect to vehicle 120 may be determined on the basis of the direction and/or the intensity of the signal, and/or information comprised in the detected signal, such as a GPS position of vehicle 110.

The position and orientation of vehicle 110 with respect to vehicle 120 may have been determined by vehicle 120 when it was being parked next to vehicle 110 using its sensors for autonomous driving. Examples for such sensors are cameras, LIDAR and/or RADAR devices.

When it has been determined that vehicle 120 is not parked parallelly and directly next to the vehicle for which the unlock-signal was intended, vehicle 120 will not autonomously drive out of its parked position (also referred to as the second position), i.e. it will stay in its parked position and continue to monitor whether it detects an unlock-signal.

When it has been determined that vehicle 120 is indeed parked parallelly and directly next to the vehicle 110, vehicle 120 will autonomously drive at least partly out of its parked position, as is depicted in FIG. 1b. This will allow the driver of vehicle 110 to open door 150 of vehicle 110, i.e. it will allow the driver to enter his vehicle and to drive his vehicle out of its parked position (also referred to as the first position).

When it is determined that vehicle 110 has left (at least partly) its parked position, vehicle 120 may return to its parked position, and thus vehicle 120 will drive autonomously back in its parked position.

Vehicle 120 may use its sensors for autonomous driving for determining that vehicle 110 has left (at least partly) its parked position.

In this way, the driver of vehicle 110 has been able to drive its vehicle 110 out of its parked position, even when vehicle 120 that was parked next to it, did not observe the standard minimum parking distance d2.

FIG. 2 shows a schematic overview of an embodiment of the method 200 for driving autonomously out of a parked position by a vehicle 120, comprising the steps of:

Step 210: detecting an unlock-signal for a first vehicle parked at a first position by a second vehicle parked at a second position;

Step 220: determining whether said first and second vehicle are parked parallelly and directly next to each other in response to said unlock-signal;

Step 230: if so, driving the second vehicle autonomously at least partly out of the second position, thereby allowing a driver of the first vehicle to enter the first vehicle and to drive the first vehicle at least partly out of said first position;

Step 240: determining whether the first vehicle has left at least partly said first position; and, Step 250: if so, driving the second vehicle autonomously back in said second position.

Step 220 may comprise the following steps:

Step 221: activating a sensor in said second vehicle in response to said unlock-signal;

Step 222: detecting, by said sensor, a signal, transmitted by said first vehicle in response to said unlock signal or a further unlock-signal; and, Step 223: determining whether said first and second vehicle are parked parallelly and directly next to each other, based on said detected signal.

Figure 3:
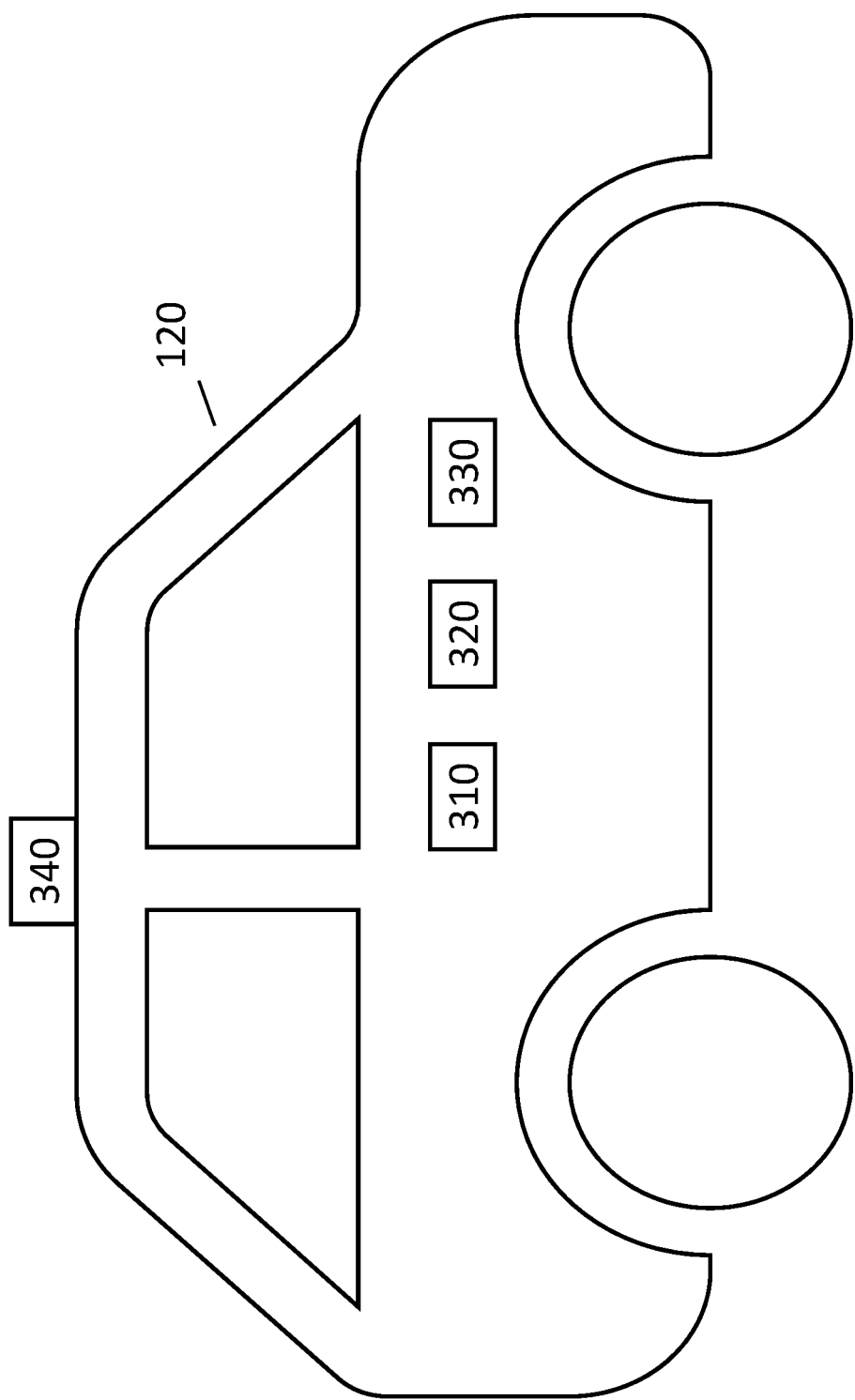

Step 223 may comprise the following steps:

Step 224: determining a position and orientation of said first vehicle by said second vehicle;

Step 225: determining a position and orientation of said second vehicle by said second vehicle; and, Step 226: determining whether said first and second vehicle are parked parallelly and directly next to each other, based on said determined position and orientation of said first vehicle and said determined position and orientation of said second vehicle, FIG. 3 shows a schematic overview of an embodiment of vehicle 120 according to the invention. Vehicle 120 may comprise:

a detector 310 arranged for detecting an unlock-signal 160 for a first vehicle 110 parked at a first position;

a determination unit 320 arranged for determining whether said first and second vehicle are parked parallelly and directly next to each other in response to said unlock-signal 160;

an autonomous driving unit 330 for driving the second vehicle 120 autonomously at least partly out of the second position, when it is determined that said first and second vehicle are parked parallelly and directly next to each other, The determination unit 320 may be further arranged for determining whether the first vehicle 110 has left at least partly said first position. The autonomous driving unit 330 may be further arranged for driving the second vehicle 120 autonomously back in said second position, when it is determined that the first vehicle 110 has left at least partly said first position.

The vehicle 120 may comprise a sensor 340 arranged for being activated in response to said unlock-signal 160 and for detecting a signal, transmitted by said first vehicle 110, in response to said unlock-signal or a further unlock-signal. The determination unit 320 may be arranged for determining whether said first and second vehicle are parked parallelly and directly next to each other, based on said detected signal.

As will be appreciated by one skilled in the art, aspects of the present invention may be embodied as a system, device, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "unit", "module", "system", "device" or "element".

Functions or steps described in this document may be implemented as an algorithm executed by a microprocessor of a computer. Furthermore, aspects of the present invention may take the form of a computer program product embodied in one or more computer readable medium(s) having computer readable program code embodied, e.g., stored, thereon.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A method for driving autonomously out of a parked position by a vehicle, comprising the steps of:
    a) detecting an unlock-signal for unlocking a central locking system of a first vehicle parked at a first position by a second vehicle parked at a second position;
    b) determining whether said first and second vehicle are parked parallelly and directly next to each other in response to said unlock-signal;
    c) when said first and second vehicle are parked parallelly and directly next to each, driving the second vehicle autonomously at least partly out of the second position, thereby allowing a driver of the first vehicle to enter the first vehicle and to drive the first vehicle at least partly out of said first position;
    d) determining whether the first vehicle has left at least partly said first position; and,
    e) when the first vehicle has left at least partly said first position, driving the second vehicle autonomously back in said second position.

2. The method according to claim 1, wherein step b) comprises:
    b1) activating a sensor in said second vehicle in response to said unlock-signal;
    b2) detecting, by said sensor, a signal, transmitted by said first vehicle in response to a further unlock-signal; and,
    b3) determining whether said first and second vehicle are parked parallelly and directly next to each other, based on said detected signal.

3. The method according to claim 2, wherein said sensor in said second vehicle is a camera and said signal from said first vehicle is an indicator light signal.

4. The method according to claim 2, wherein said sensor in said second vehicle is an electromagnetic signal detector, and said signal from said first vehicle is a TPMS signal.

5. The method according to claim 2, wherein said sensor in said second vehicle is an ultrasonic detector, and said signal from said first vehicle is an ultrasonic park distance signal.

6. The method according to claim 2, wherein step b3) comprises:
    b3a) determining a position and orientation of said first vehicle by said second vehicle;
    b3b) determining a position and orientation of said second vehicle by said second vehicle; and,
    b3c) determining whether said first and second vehicle are parked parallelly and directly next to each other, based on said determined position and orientation of said first vehicle and said determined position and orientation of said second vehicle.

7. The method according to claim 6, wherein said position and orientation of said first vehicle are determined based on information received by said second vehicle using Vehicle-to-X Communication from said first vehicle.

8. The method according to claim 6, wherein said position and orientation of said first vehicle are determined based on information gathered by sensors of said second vehicle when parking into said second position.

9. A vehicle for driving autonomously out of a parked position, said vehicle comprising:
    a) a detector arranged for detecting an unlock-signal for unlocking a central locking system of a first vehicle parked at a first position
    b) a determination unit arranged for determining whether said first and second vehicle are parked parallelly and directly next to each other in response to said unlock-signal;
    c) an autonomous driving unit for driving the second vehicle autonomously at least partly out of the second position, when it is determined that said first and second vehicle are parked parallelly and directly next to each other,
    wherein said determination unit is further arranged for determining whether the first vehicle has left at least partly said first position; and,
    wherein said autonomous driving unit is further arranged for driving the second vehicle autonomously back in said second position, when it is determined that the first vehicle has left at least partly said first position.

10. The vehicle according to claim 9, further comprising:
    a sensor arranged for being activated in response to said unlock-signal and for detecting a signal transmitted by said first vehicle in response to a further unlock-signal,
    wherein said determination unit is arranged for determining whether said first and second vehicle are parked parallelly and directly next to each other, based on said detected signal.

11. The vehicle according to claim 10, wherein
    said sensor is a camera and said signal from said first vehicle is an indicator light signal; or,
    said sensor is an electromagnetic signal detector and said signal from said first vehicle is a TPMS signal; or,
    said sensor is an ultrasonic detector and said signal from said first vehicle is an ultrasonic park distance signal.

12. The vehicle according to claim 9, wherein said determination unit is arranged for i) determining a position and orientation of said first vehicle by said second vehicle, ii) determining a position and orientation of said second vehicle by said second vehicle; and iii) determining whether said first and second vehicle are parked parallelly and directly next to each other, based on said determined position and orientation of said first vehicle and said determined position and orientation of said second vehicle.

13. The vehicle according to claim 12, wherein said determination unit is arranged for receiving information using Vehicle-to-X Communication, from said first vehicle, for determining said position and orientation of said first vehicle.

14. The vehicle according to claim 12, wherein said determination unit comprises sensors for gathering information about the position and orientation of said first vehicle when parking and wherein said determination unit is arranged for determining said position and orientation of said first vehicle based on said gathered information.

\* \* \* \* \*